(12) United States Patent
Hisamoto

(10) Patent No.: US 9,061,621 B2
(45) Date of Patent: Jun. 23, 2015

(54) SEAT-CUSHION SHELL UNIT AND SHELL SEAT FOR VEHICLE

(71) Applicant: NHK Spring Co., Ltd., Yokohama-shi, Kanagawa (JP)

(72) Inventor: Tadanori Hisamoto, Yokohama (JP)

(73) Assignee: NHK SPRING CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 13/751,275

(22) Filed: Jan. 28, 2013

(65) Prior Publication Data

US 2013/0134756 A1 May 30, 2013

Related U.S. Application Data

(63) Continuation of application No. PCT/JP2011/068465, filed on Aug. 12, 2011.

(30) Foreign Application Priority Data

Aug. 20, 2010 (JP) .................................. 2010-185308

(51) Int. Cl.
| | |
|---|---|
| B60N 2/02 | (2006.01) |
| B60N 2/68 | (2006.01) |
| B60N 2/16 | (2006.01) |
| B60N 2/18 | (2006.01) |
| B60N 2/10 | (2006.01) |
| B60N 2/50 | (2006.01) |
| B60N 2/54 | (2006.01) |
| B60N 2/70 | (2006.01) |

(52) U.S. Cl.
CPC .............. *B60N 2/686* (2013.01); *B60N 2/1615* (2013.01); *B60N 2/1803* (2013.01); *B60N 2/10* (2013.01); *B60N 2/16* (2013.01); *B60N 2/507* (2013.01); *B60N 2/542* (2013.01); *B60N 2/707* (2013.01); *B60N 2/7094* (2013.01)

(58) Field of Classification Search
USPC ............. 297/452.55, 452.12, 344.15, 344.16, 297/344.17, 313
See application file for complete search history.

(56) References Cited

U.S. PATENT DOCUMENTS 4,209,158 A * 6/1980 Pickles .......................... 248/421
4,726,623 A * 2/1988 Kazaoka et al. .......... 297/452.65
(Continued)

FOREIGN PATENT DOCUMENTS

CN 101107150 A 1/2008
DE 10 2008 018 317 A1 10/2009
(Continued)

OTHER PUBLICATIONS

International Search Report dated Oct. 18, 2011 (in English) in counterpart International Application No. PCT/JP2011/068465.
(Continued)

*Primary Examiner* — David R Dunn
*Assistant Examiner* — Alexander Harrison
(74) *Attorney, Agent, or Firm* — Holtz, Holtz, Goodman & Chick PC

(57) ABSTRACT

A seat-cushion shell unit is configured to include a support panel provided to be movable up and down and tiltable to an arbitrary angle below a seat cushion shell, and a support pad provided between the seat cushion shell and the support panel. A front end part and a rear end part of a support panel are fixed to the seat frame, and the seat-cushion shell unit is attached to the seat frame.

6 Claims, 4 Drawing Sheets

(56) References Cited

U.S. PATENT DOCUMENTS

| | | | |
|---|---|---|---|
| 5,772,281 A | 6/1998 | Massara | |
| 5,839,782 A * | 11/1998 | Kashiwamura et al. | 297/337 |
| 6,036,266 A | 3/2000 | Massara | |
| 6,062,642 A | 5/2000 | Sinnhuber et al. | |
| 7,090,300 B2 * | 8/2006 | Fujita | 297/452.49 |
| 7,503,627 B2 * | 3/2009 | Kawasaki | 297/452.56 |
| 2008/0309142 A1 | 12/2008 | Kidokoro et al. | |
| 2012/0133193 A1 * | 5/2012 | Abe et al. | 297/452.55 |
| 2013/0161989 A1 * | 6/2013 | Ito | 297/313 |
| 2013/0200677 A1 * | 8/2013 | Hoshi et al. | 297/344.15 |

FOREIGN PATENT DOCUMENTS

| | | | |
|---|---|---|---|
| EP | 0 982 180 A1 | 3/2000 | |
| FR | 1 371 987 A | 9/1964 | |
| JP | 2002-315648 A | 10/2002 | |
| JP | 2008-526425 A | 7/2008 | |
| WO | WO 97/19727 A1 | 6/1997 | |
| WO | WO 98/32627 A1 | 7/1998 | |

OTHER PUBLICATIONS

Extended European Search Report (EESR) dated Dec. 16, 2013 (in English) issued in counterpart European Application No. 11818162.7.

International Preliminary Report on Patentability (IPRP) dated Mar. 28, 2013 (in English) issued in parent International Application No. PCT/JP2011/068465.

Chinese Office Action dated Sep. 15, 2014, issued in counterpart Chinese Application No. 201180040203.8.

* cited by examiner

SEAT-CUSHION SHELL UNIT AND SHELL SEAT FOR VEHICLE

CROSS REFERENCE TO RELATED APPLICATIONS

This application is a Continuation application of PCT Application No. PCT/JP2011/068465, filed Aug. 12, 2011 and based upon and claiming the benefit of priority from prior Japanese Patent Application No. 2010-185308, filed Aug. 20, 2010, the entire contents of all of which are incorporated herein by reference.

BACKGROUND OF THE INVENTION

1. Field of the Invention

The present invention relates to a seat-cushion shell unit used for a shell seat for a vehicle, and to the shell seat for a vehicle.

2. Description of the Related Art

A so-called shell seat for a vehicle, which combines a seat shell with a seat frame, is disclosed in, for example, Jpn. PCT National Publication No. 2008-526425 official. This shell seat for a vehicle is configured in a manner that, a seat shell having a shape which fits a rear of a human body, for example, the human back and buttocks, is assembled on a seat frame attached to a vehicle body, allowing a vehicle occupant to sit in the seat shell.

This shell seat for a vehicle is formed and improves seating comfort with appropriate elasticity by providing an elastic member between the seat frame and the seat shell. For example, the seat cushion frame is provided with an elastic member, and the seat cushion shell is set on the elastic member. In this manner, the seat cushion shell is supported to be movable up and down, thereby improving seating comfort.

In addition, recently, the seat is provided with a height adjustment mechanism so that height of a seat cushion can be adjusted. The height adjustment mechanism is comprised of, for example, a parallel link mechanism and a drive unit, and appropriately moves the seat cushion shell up and down by operating the drive unit.

BRIEF SUMMARY OF THE INVENTION

However, a support plate which supports an elastic member is bridged between left and right frames. Therefore, if a height adjustment mechanism is provided, the mechanism interferes with the link of the height adjustment mechanism, and is not able to sufficiently ensure length of the support plate in a front-rear direction. Therefore, a vehicle occupant's weight is supported within a small area, which causes a need to a cushion property by increasing thickness of the elastic member. Then, a problem occurs in that a large storage capacity below the seat cushion and increases the seat size.

Since the elastic member is positioned, deviated to a part of the seat cushion shell, for example, the elastic member cannot be provided in a front part of the seat, to support thigh parts by the elastic member. Further, problems occur in that, if the support plate is extended frontward or rearward, the support plate is cantilevered, and if the thickness of the support plate is increased, the weight of the seat cannot be reduced.

Further, since the shell seat needs to be provided with an elastic member below the seat cushion shell, the seat cannot be configured by using a conventional seat frame which is not compatible with a shell seat. Therefore, the shell seat needs to be configured by using a seat using the seat frame compatible with the shell seat.

Hence, the invention has an object of providing a seat cushion shell and a shell seat for a vehicle, which have multiplicity of use and can therefore be attached to various seat frames.

To solve the above problems, a seat-cushion shell unit and a shell seat for a vehicle, according to the invention, are configured as follows.

The shell seat for a vehicle is configured by a seat frame attached to a vehicle body, and a seat shell assembled on the seat frame. The seat shell is configured by a seat cushion shell and a seat back shell.

The seat-cushion shell unit is configured by a seat cushion shell, a support panel, and a support pad. Below the seat cushion shell, there is provided the support panel. The seat cushion shell and the support panel are connected by a joint mechanism to be movable up and down and freely tiltable, relatively to each other. Between the seat cushion shell and the support panel, the support pad made of an elastic material is provided, and the seat cushion shell is elastically supported on the support panel by the support pad.

The seat-cushion shell unit is attached by fixing front and rear parts of the support panel to the seat frame.

DETAILED DESCRIPTION OF THE INVENTION

An embodiment of a seat-cushion shell unit for a shell seat for a vehicle, and the shell seat for a vehicle, according to the invention, will be described with reference to the drawings.

Figure 5:
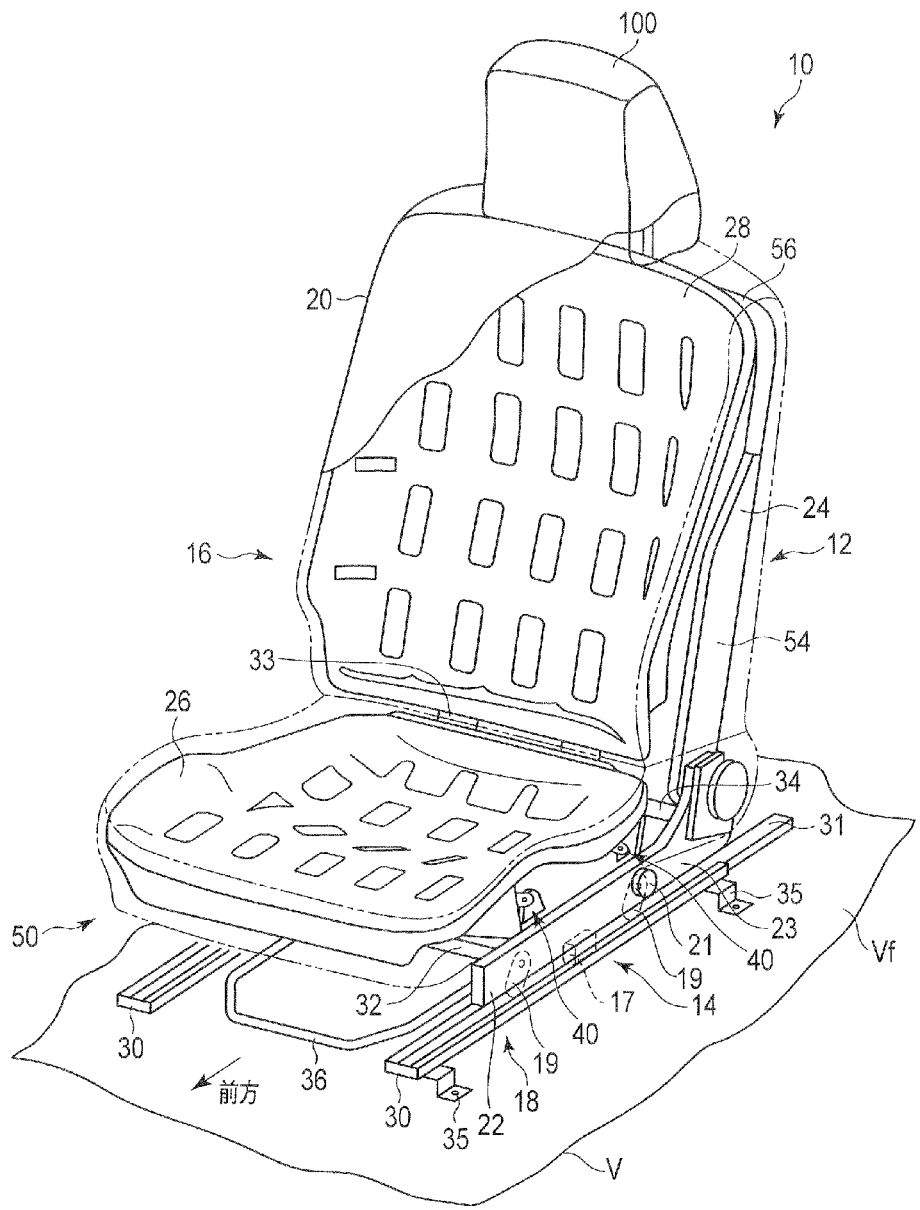
FIG. 5 is an exploded perspective view showing the seat for a vehicle.

FIG. 5 shows a shell seat 10. The seat 10 is a seat for a vehicle, for example, individual seats such as a driver's seat and a passenger seat in which individual vehicle occupants sit.

The seat 10 comprises a seat frame 12, a forward/backward-position adjustment mechanism 14, and a seat shell 16 comprising a seat cushion shell 26 and a seat back shell 28, a height-position adjustment mechanism 18, and an exterior cover material 20. In addition, as will be described later, the seat-cushion shell unit 50 is configured by the seat cushion shell 26. Hereinafter, the seat 10 will be described supposing that the front is a side in the forward moving direction of a vehicle V (refer to FIG. 5) equipped with the seat 10 and the front, rear, left, and right are defined with reference to the front. The gravitational direction is downward and the opposite direction thereof is upward.

Figure 4:
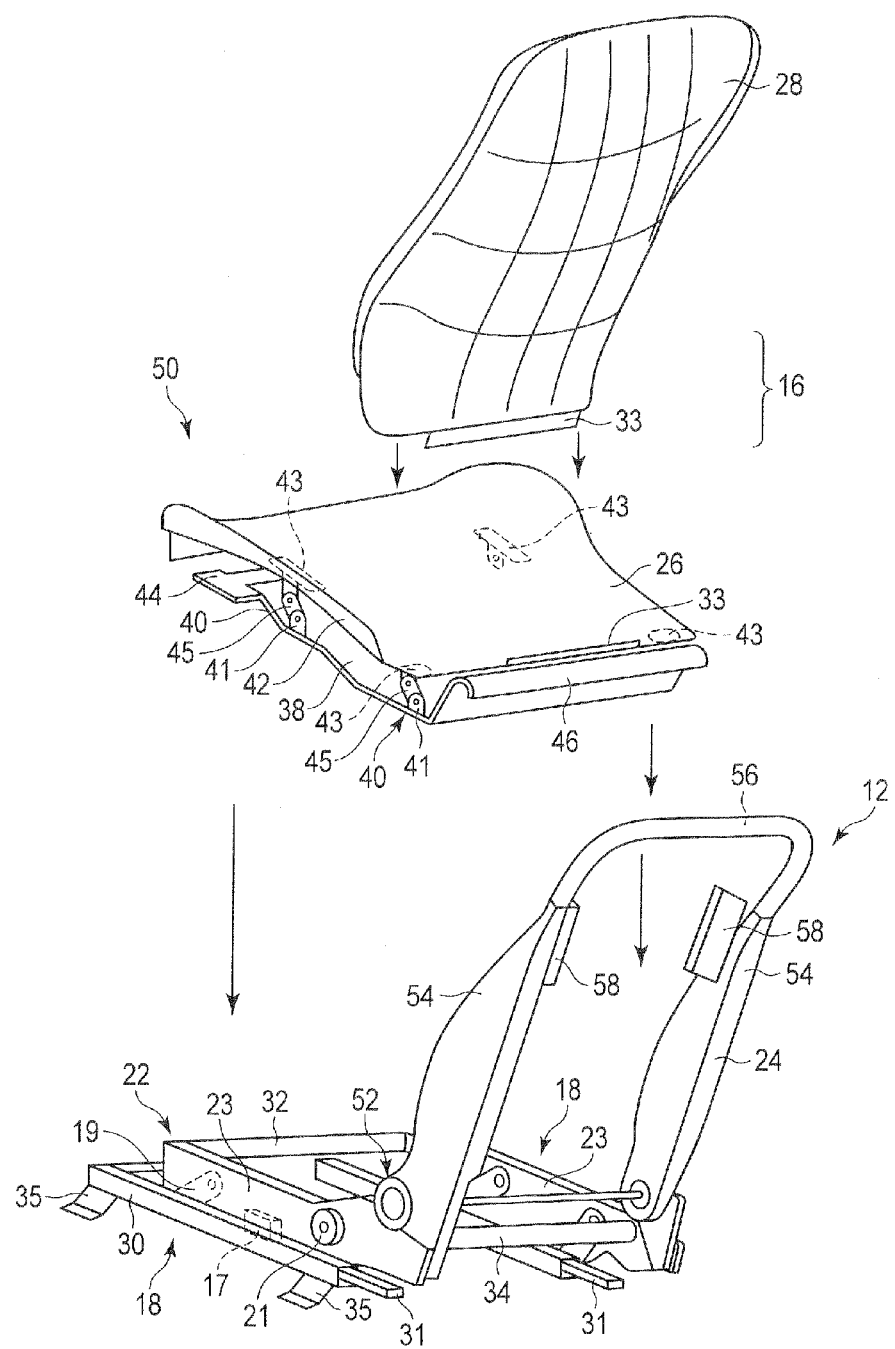
FIG. 4 is an exploded perspective view showing the seat for a vehicle.

The seat frame 12, as shown in FIG. 4, is configured by a seat cushion frame 22 and a seat back frame 24. The seat cushion frame 22 is configured by a pair of side cushion frames 23 provided in the left and right, a submarine pipe 32 which connects the left and right side cushion frames 23, and a rear link pipe 34.

The submarine pipe 32 is provided in the front side of the side cushion frames 23, and connects the right and left side cushion frames 23. The rear link pipe 34 is provided in the rear side of the side cushion frames 23, and connects the right and left side cushion frames 23. The side cushion frames 23 are respectively attached to slide bars 31 through the height-position adjustment mechanism 18 described later.

A seat back frame 24 is pivotally connected to rear ends of the seat cushion frames 22. An angle adjustment mechanism 52 is provided between the seat cushion frames 22 and the seat back frame 24. By operating the angle adjustment mechanism 52, the seat back frame 24 is pivoted causing adequate friction, i.e., the seat back frame 24 is tilted in the front-rear direction and fixed at a desired angle. In addition, angle adjustment of the seat back frame 24 may be performed electrically.

The seat back frame 24 is configured by side frames 54 positioned right and left, and an upper frame 56 positioned above. The side frames 54 are provided, as a pair, in the left and right, and is connected with the seat cushion frame 22. The upper frame 56 is provided above the side frames 54, and fixes the left and right side frames 54 from above.

A headrest 100 is attached to the upper frame 56.

A front-rear-position adjustment mechanism 14 is provided below the seat frame 12. The front-rear-position adjustment mechanism 14 is configured by two guide rails 30, engaging mechanisms 17, and mounting legs 35. The two guide rails 30 are arranged parallel to one another along the front-rear direction of the vehicle, at a predetermined interval between each other, and is fixed on a floor Vf of the vehicle with screws inserted through the mounting legs 35.

The guide rails 30 movably retain slide bars 31. As for the slide bars 31, the slide bars 31 are fixed to predetermined positions by engaging operation of the engaging mechanisms 17. In lower front of the seat 10, an operation bar 36 for operating the engaging mechanisms 17 is provided. For example, claws provided on the sides of the engaging mechanisms 17 may be configured to be engaged with notches formed at predetermined intervals on the sides of the slide bars 31. In addition, the front-rear position adjustment mechanism 14 may be of an electric drive type using an electric motor.

A height-position adjustment mechanism 18 is provided between the slide bars 31 and the seat cushion frame 22. The height-position adjustment mechanism 18 is configured by parallel links 19 and a drive mechanism 21. The parallel links 19 are provided at front and rear ends of the left and right side cushion frames 23, respectively, and connect the left and right slide bars 31. The parallel links 19 move the seat cushion frame 22 up and down parallel to the slide bars 31. The drive mechanism 21 is a link operation mechanism of, for example, a dial type, sets any of the parallel links 19 at an arbitrary angle, and moves the seat cushion frame 22 up and down in relation to the slide bars 31.

A seat shell 16 is attached to the seat frame 12. The seat shell 16, as shown in FIG. 4, is configured by the seat cushion shell 26 and the seat back shell 28.

The seat cushion shell 26 is made of hard synthetic resin material, and is formed in a shape which fits mainly the thighs and buttock of a human body. On a lower surface of the seat cushion shell 26, mounting bracket 43 are provided at four positions. The seat back shell 28 is made of hard synthetic resin material, like the seat cushion shell 26, and is formed in a shape which fits the back of a human body. The seat back shell 28 is screwed to the mounting metals 58 of the seat back frame 24.

One part of a hinge 33 is attached to the seat hack shell 28 and is connected with the other one part of the hinge 33 attached to the seat cushion shell 26, to be tiltable centered on the hinge 33 along the front-rear direction. In addition, material of the seat cushion shell 26 and the seat hack shell 28 may be light-alloy such as aluminum, FRP, or wood, in place of synthetic resin material, and is not particularly limited.

The exterior cover material 20 is provided in the outermost layer of the seat 10, as shown in FIG. 5. An elastic body may be appropriately inserted between the exterior cover material 20 and the seat shell 16. The seat cushion shell 26 together with a support pad 42 including an elastic body is attached, as the seat-cushion shell unit 50, to the seat cushion frame 22.

Figure 1:
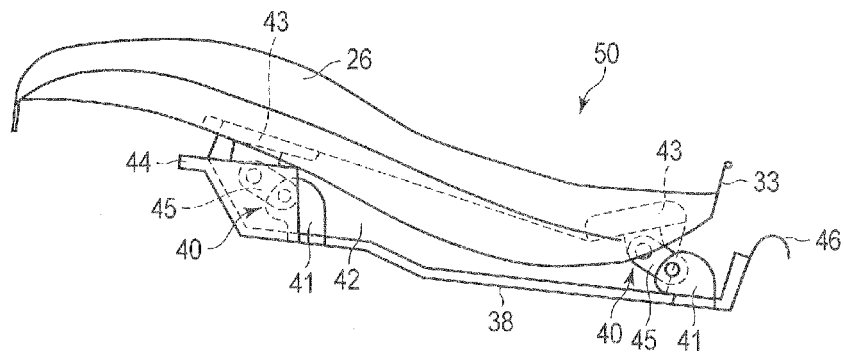
FIG. 1 is a side view showing a seat-cushion shell unit for a seat for a vehicle, according to an embodiment of the invention.

Next, the seat-cushion shell unit 50 will be described. FIG. 1 shows the seat-cushion shell unit 50. The seat-cushion shell unit 50 is configured by the seat cushion shell 26, a support panel 38, joint mechanisms 40, and the support pad 42.

Figure 2:
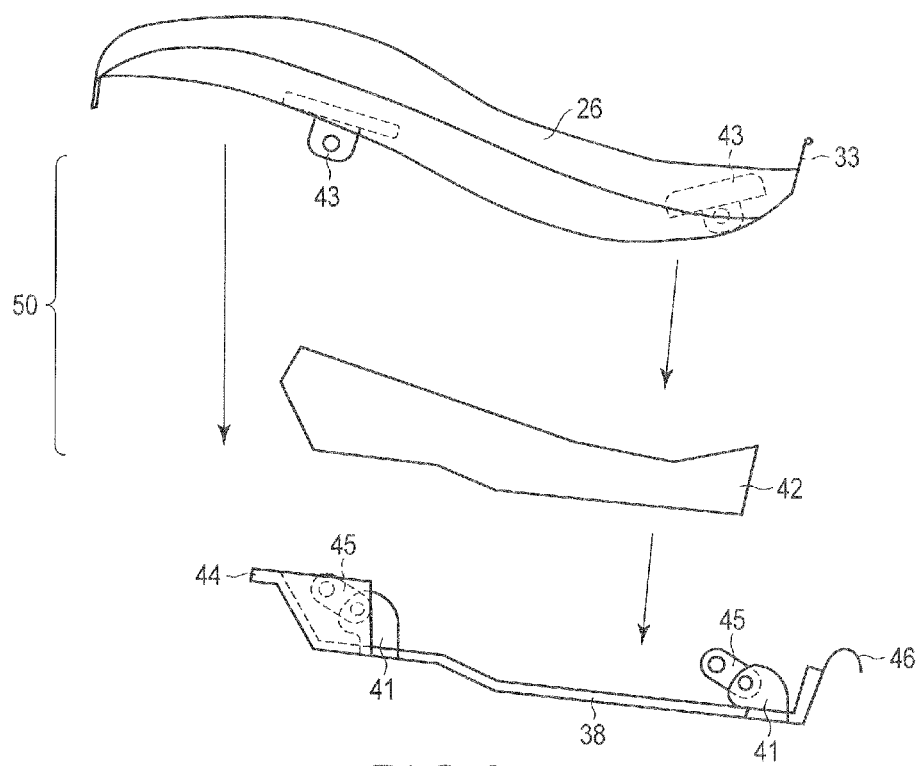
FIG. 2 is an exploded view showing the seat-cushion shell unit.
Figure 3:
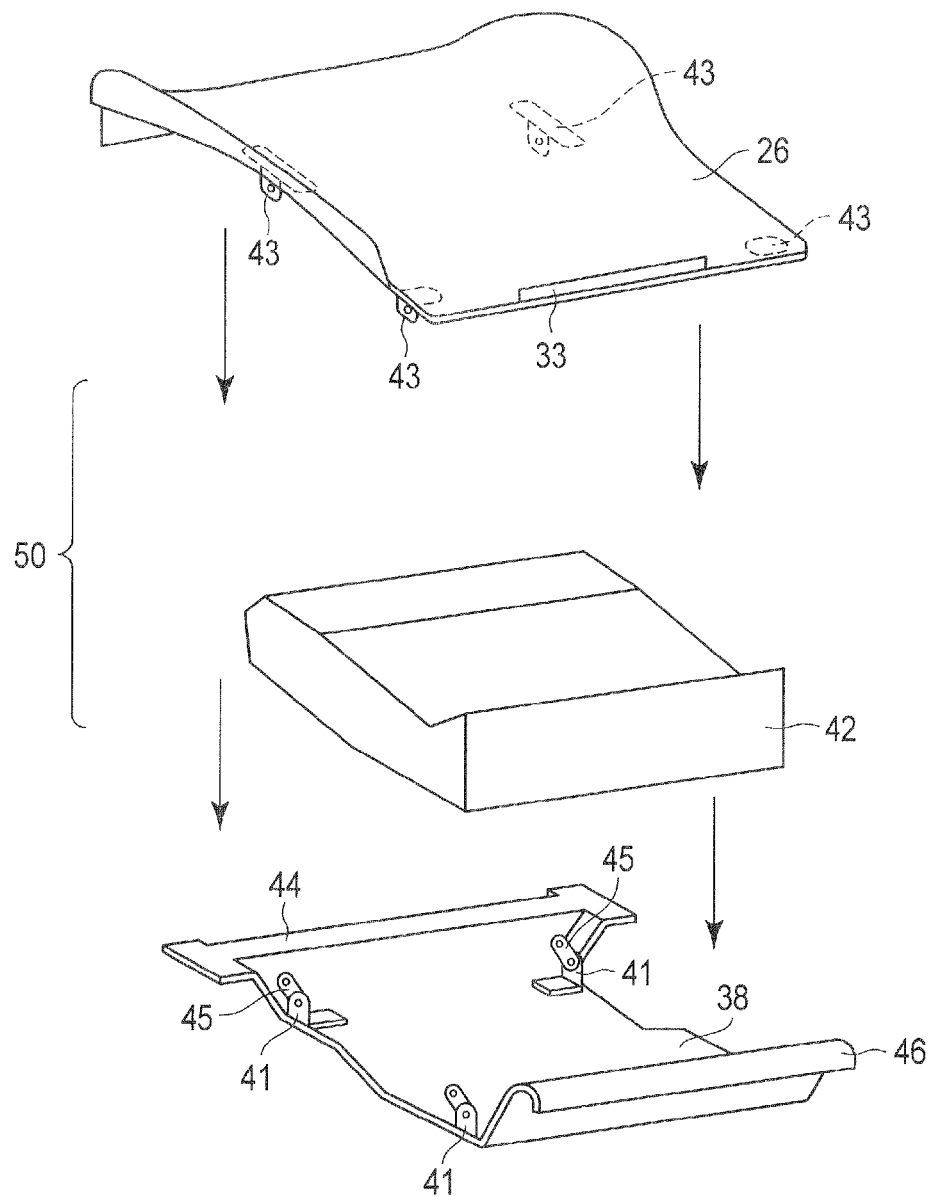
FIG. 3 is an exploded perspective view showing the seat-cushion shell unit.

The support panel 30 is a plate-like member, as shown in FIG. 2 and FIG. 3, and is provided with mounting brackets 41 at four corners. The mounting brackets 41 are provided corresponding to the mounting brackets 43 of the seat cushion, shell 26, and joints 45 are provided between the mounting brackets 41 and the mounting brackets 43, thereby forming the joint mechanisms 40. The joint mechanisms 40 each are independently bendable, and the seat cushion shell 26 and the support panel 38 are connected to each other by the individual joint, mechanisms 40, so as to be movable up and down and tiltable to an arbitrary angle.

The support pad 42 is a sponge-like, member which is made of soft synthetic-resin foam material, and is positioned between the seat cushion shell 26 and the support panel 38, as shown in FIG. 1. The seat cushion shell 26 is made moderately elastic and repulsive by the support pad 42.

In place of the soft synthetic-resin foam material, the support pad 42 may be metal springs, an air spring, or a hydraulic cushion, and the material and mechanism are not particularly limited.

A front end part 44 of the support panel 38 is fixed to the submarine pipe 32 of the seat frame 12 by screws, and a rear end part 46 is attached to the rear link pipe 34 by screws or by hanging a curved part thereon. In this manner, the seat-cushion shell unit 50 is attached to the seat frame 12, i.e., the seat cushion frame 22.

Next, operation and effects of the seat 10 will be described. In the seat-cushion shell unit 50 of the seat 10, the support panel 38 is fixed to the seat cushion frame 22. When a vehicle occupant sits in the seat 10 and the vehicle, for example, moves up and down, the seat cushion shell 26 moves up and down in relation to the support panel 38. Then, the support pad 42 provided between the seat cushion shell 26 and the support panel 38 deforms elastically, the seat cushion shell 26 moves up and down together with the vehicle occupant, and moderately absorbs shocks, to achieve seating comfort. In addition, by fixing the front end part 44 and rear end part 46 of the seat-cushion shell unit 50 to the seat frame 12, the seat cushion shell 26 is attached to the seat frame 12. Therefore, installation is possible on a seat frame which is not compatible with a conventional shell type.

Since the support panel 38 is extended in the front-rear directions of the seat cushion shell 26, the support pad 42 can be arranged so widely as to include, particularly, the thighs of the vehicle occupant, and can effectively distribute the load of the vehicle occupant. Further, since the area of the support pad 42 can be widened, the support pad 42 can be thinned, and the entire seat 10 can be configured to be thin. Since the support panel 38 does not have a cantilever structure, a sufficient rigidity can be configured by a thin member, and weight reduction of the seat 10 can be achieved.

Thus, the seat-cushion shell unit of the shell seat for a vehicle and the shell seat for a vehicle, according to the invention, have the effects as follows. That is, the seat-cushion shell unit is attached to the seat frame by fixing the support panel to the seat frame. Accordingly, the shell seat for a vehicle can be configured by attaching the seat-cushion shell unit to a conventional seat frame which is not compatible with a shell seat.

The seat cushion shell is supported with elasticity by the support pad and hence achieves seating comfort. Since the front and rear of the support panel are configured to be attached to the seat frame, the support panel can be set to be wide in the front-rear directions, and the whole seat cushion shell can be supported elastically by the support pad. Since the area of a support panel can be widened, the support pad can be thinned, and the shell seat for a vehicle can accordingly be thinned. Without requiring any space to attach the support panel in neither the right nor left side of the seat, interference with the height adjustment mechanism which moves the seat cushion shell up and down can be prevented, and the configuration and installation are simplified.

Incidentally, the shell seat for a vehicle, according to the invention, may be a seat in which a plurality of persons sit. Further, the seat 10 is not limited to a seat for a so-called automobile.

The invention is not limited to the embodiment described above but can variously modified and practiced without deviating from the subject matters of the invention, of course.

The present invention can be used for a shell seat for a vehicle which comprises a seat shell.

What is claimed is:

1. A seat-cushion shell unit for a shell seat for a vehicle, the shell seat comprising a seat frame, a forward/backward-position adjustment mechanism provided below the seat frame, and an exterior cover material provided as the outermost layer of the shell seat, and the seat-cushion shell unit comprising:
   a seat cushion shell made of a substantially rigid material;
   a support panel connected to a bottom of the seat cushion shell by a joint mechanism so as to be movable up and down and be tiltable to an arbitrary angle, the support panel comprising a to surface portion; and
   an elastic body provided between the support panel and the seat cushion shell, the elastic body comprising a bottom surface portion which is in surface contact with the to surface portion of the support panel along substantially an entirety of the bottom surface portion of the elastic body and the top surface portion of the support panel,
   wherein the seat-cushion shell unit is attachable to the seat frame through the support panel.

2. The seat-cushion shell unit according to claim 1, wherein front and rear parts of the support panel are attachable to the seat frame.

3. A shell seat for a vehicle, comprising:
   the seat frame;
   the forward/backward-position adjustment mechanism provided below the seat frame;
   the exterior cover material provided as the outermost layer of the shell seat;
   the seat-cushion shell unit according to claim 1;
   a seat back shell; and
   a height adjustment mechanism which adjusts a height of the seat-cushion shell unit,
   wherein the height adjustment mechanism comprises link mechanisms provided at left and right sides of the seat frame, and a drive mechanism which drives the link mechanisms.

4. A shell seat for a vehicle, comprising:
   the seat frame;
   the forward/backward-position adjustment mechanism provided below the seat frame;
   the exterior cover material provided as the outermost layer of the shell seat;
   the seat-cushion shell unit according to claim 2;
   a seat back shell; and
   a height adjustment mechanism which adjusts a height of the seat-cushion shell unit,
   wherein the height adjustment mechanism comprises link mechanisms provided at left and right sides of the seat frame, and a drive mechanism which drives the link mechanisms.

5. A seat-cushion shell unit for a shell seat for a vehicle, the shell seat comprising a seat frame, a forward/backward-position adjustment mechanism provided below the seat frame, and an exterior cover material provided as the outermost layer of the shell seat, the seat-cushion shell unit being detachably attachable to the seat frame forming an exterior shape of a chair, and the seat-cushion shell unit comprising:
   a seat cushion shell which is made of a substantially rigid material and which serves as a bearing face;
   a support panel arranged below the seat cushion shell, the support panel comprising a to surface portion and an engaging part which is engageable with the seat frame;
   a joint mechanism which connects a bottom of the seat cushion shell to the support panel so as to be movable up and down and be tiltable to an arbitrary angle; and
   an elastic body provided between the support panel and the seat cushion shell, the elastic body comprising a bottom surface portion which is in surface contact with the to surface portion of the support panel along substantially an entirety of the bottom surface portion of the elastic body and the top surface portion of the support panel.

6. A shell seat for a vehicle, comprising:
   a seat frame which is set on a floor and forms an exterior shape of a seat;
   a forward/backward-position adjustment mechanism provided below the seat frame;
   an exterior cover material provided as the outermost layer of the shell seat;
   a seat back shell which is attached to the seat frame and serves as a back face;
   a seat cushion shell which is made of a substantially rigid material, which is attached to the seat frame, and which serves as a bearing face;
   a support panel arranged below the seat cushion shell, the support panel comprising a to surface portion and an engaging part engaged with the seat frame;
   a joint mechanism which connects a bottom of the seat cushion shell to the support panel so as to be movable up and down and be tiltable to an arbitrary angle;
   an elastic body provided between the support panel and the seat cushion shell, the elastic body comprising a bottom surface portion which is in surface contact with the to surface portion of the support panel along substantially an entirety of the bottom surface portion of the elastic body and the top surface portion of the support panel; and
   a height adjustment mechanism which adjusts a height of the seat frame from the floor and which comprises (i)

link mechanisms provided at left and right sides of the seat frame, and (ii) a drive mechanism to drive the link mechanisms.

\* \* \* \* \*